United States Patent
Karantonis et al.

(10) Patent No.: US 12,433,528 B2
(45) Date of Patent: Oct. 7, 2025

(54) NEURAL STIMULATION FOR REDUCED ARTEFACT

(71) Applicant: Saluda Medical Pty Ltd, Macquarie Park (AU)

(72) Inventors: Dean Michael Karantonis, Macquarie Park (AU); Peter Scott Vallack Single, Macquarie Park (AU); Kai Huang, Macquarie Park (AU)

(73) Assignee: Saluda Medical Pty Ltd, Macquarie Park (AU)

(*) Notice: Subject to any disclaimer, the term of this patent is extended or adjusted under 35 U.S.C. 154(b) by 0 days.

(21) Appl. No.: 18/490,698

(22) Filed: Oct. 19, 2023

(65) Prior Publication Data
US 2024/0172985 A1 May 30, 2024

Related U.S. Application Data

(63) Continuation of application No. 17/510,264, filed on Oct. 25, 2021, now Pat. No. 11,826,156, which is a (Continued)

(30) Foreign Application Priority Data

Jun. 24, 2016 (AU) ................ 2016902492

(51) Int. Cl.
*A61B 5/377* (2021.01)
*A61B 5/00* (2006.01)
(Continued)

(52) U.S. Cl.
CPC ............ *A61B 5/377* (2021.01); *A61B 5/05* (2013.01); *A61B 5/24* (2021.01); *A61B 5/291* (2021.01);
(Continued)

(58) Field of Classification Search
CPC . A61B 5/0478; A61B 5/0484; A61B 5/04011; A61B 5/686; A61B 5/24–398; A61N 1/36–3787
See application file for complete search history.

(56) References Cited

U.S. PATENT DOCUMENTS

| | | |
|---|---|---|
| 5,143,081 A | 9/1992 | Young et al. |
| 6,246,912 B1 | 6/2001 | Sluijter et al. |

(Continued)

FOREIGN PATENT DOCUMENTS

| | | |
|---|---|---|
| AU | 2021202187 B2 | 7/2023 |
| AU | 2023237038 A1 | 10/2023 |

(Continued)

OTHER PUBLICATIONS

De Ridder et al., Burst Spinal Cord Stimulation toward Paresthesia-Free Pain Suppression, Neurosurgery-online.com, May 2010, vol. 66, No. 8, pp. 986-990.

(Continued)

*Primary Examiner* — Thaddeus B Cox
(74) *Attorney, Agent, or Firm* — Barnes & Thornburg LLP

(57) ABSTRACT

A neural stimulus comprises at least three stimulus components, each comprising at least one of a temporal stimulus phase and a spatial stimulus pole. A first stimulus component delivers a first charge which is unequal to a third charge delivered by a third stimulus component, and the first charge and third charge are selected so as to give rise to reduced artefact at recording electrodes. In turn this may be exploited to independently control a correlation delay of a vector detector and an artefact vector to be non-parallel or orthogonal.

23 Claims, 11 Drawing Sheets

Related U.S. Application Data continuation of application No. 16/311,526, filed as application No. PCT/AU2017/050647 on Jun. 23, 2017, now Pat. No. 11,179,091.

(51) Int. Cl.
  *A61B 5/05* (2021.01)
  *A61B 5/24* (2021.01)
  *A61B 5/291* (2021.01)
  *A61N 1/18* (2006.01)
  *A61N 1/36* (2006.01)
  *A61N 1/372* (2006.01)
  *A61N 1/378* (2006.01)

(52) U.S. Cl.
  CPC ............ *A61B 5/686* (2013.01); *A61B 5/7225* (2013.01); *A61N 1/18* (2013.01); *A61N 1/36* (2013.01); *A61N 1/36067* (2013.01); *A61N 1/36071* (2013.01); *A61N 1/36075* (2013.01); *A61N 1/37264* (2013.01); *A61N 1/3787* (2013.01); *A61B 2562/063* (2013.01)

(56) References Cited

U.S. PATENT DOCUMENTS

| | | | |
|---|---|---|---|
| 6,892,097 B2 | 5/2005 | Holsheimer | |
| 7,171,261 B1 | 1/2007 | Litvak et al. | |
| 7,634,315 B2 | 12/2009 | Cholette | |
| 8,060,208 B2 | 11/2011 | Kilgore et al. | |
| 8,195,287 B2 | 6/2012 | Dacey et al. | |
| 9,079,018 B2 | 7/2015 | Olsen | |
| 9,254,386 B2 | 2/2016 | Lee et al. | |
| 9,333,339 B2 | 5/2016 | Weiner | |
| 9,511,231 B1 | 12/2016 | Kent et al. | |
| 9,737,713 B2 | 8/2017 | Parramon et al. | |
| 10,518,089 B2 | 12/2019 | Lee et al. | |
| 10,537,740 B2 | 1/2020 | Carbunaru et al. | |
| 10,576,286 B1 | 3/2020 | Park | |
| 10,716,937 B2 | 7/2020 | Feldman et al. | |
| 11,071,861 B2 | 7/2021 | Gerber et al. | |
| 11,247,057 B1 | 2/2022 | Gliner | |
| 11,259,732 B2 | 3/2022 | Parramon et al. | |
| 11,318,310 B1 | 5/2022 | Bradley | |
| 11,497,917 B2 | 11/2022 | Bradley et al. | |
| 2003/0135247 A1* | 7/2003 | Zierhofer ............ | A61N 1/37252 607/60 |
| 2006/0173493 A1* | 8/2006 | Armstrong ......... | A61N 1/36157 607/45 |
| 2010/0331921 A1 | 12/2010 | Bornzin et al. | |
| 2011/0093042 A1 | 4/2011 | Torgerson et al. | |
| 2016/0158551 A1 | 6/2016 | Kent et al. | |
| 2019/0015663 A1 | 1/2019 | Bennett et al. | |
| 2021/0106829 A1 | 4/2021 | Bennett et al. | |
| 2023/0028428 A1 | 1/2023 | Grill et al. | |
| 2023/0226355 A1 | 7/2023 | De Ridder | |
| 2023/0241397 A1 | 8/2023 | Parker et al. | |
| 2023/0248975 A1 | 8/2023 | Bennett et al. | |
| 2023/0414944 A1 | 12/2023 | De Ridder | |

FOREIGN PATENT DOCUMENTS

| | | |
|---|---|---|
| AU | 2023248130 A1 | 11/2023 |
| WO | WO2002082982 A1 | 10/2002 |
| WO | WO2003101533 A1 | 12/2003 |
| WO | WO2004007018 A1 | 1/2004 |
| WO | WO2002058782 A8 | 5/2004 |
| WO | WO2004052451 A1 | 6/2004 |
| WO | WO2004087256 A1 | 10/2004 |
| WO | WO2006073393 A1 | 7/2006 |
| WO | WO2006047291 A3 | 9/2006 |
| WO | WO2006019764 A3 | 12/2006 |
| WO | WO2007038200 A1 | 4/2007 |
| WO | WO2008121891 A1 | 10/2008 |
| WO | WO2008150348 A1 | 12/2008 |
| WO | WO2009015005 A1 | 1/2009 |
| WO | WO2009056107 A1 | 5/2009 |
| WO | WO2009061813 A9 | 5/2009 |
| WO | WO2009139968 A2 | 11/2009 |
| WO | WO2010056580 A1 | 5/2010 |
| WO | WO2010032132 A4 | 6/2010 |
| WO | WO2010065146 A9 | 6/2010 |
| WO | WO2010124128 A1 | 10/2010 |
| WO | WO2010124144 A1 | 10/2010 |
| WO | WO2011041191 A1 | 4/2011 |
| WO | WO2012155187 A1 | 11/2012 |
| WO | WO2013036880 A1 | 3/2013 |
| WO | WO2014005075 A1 | 1/2014 |
| WO | WO2014159896 A1 | 10/2014 |
| WO | WO2015031136 A1 | 3/2015 |
| WO | WO2015179177 A1 | 11/2015 |
| WO | WO2016014624 A1 | 1/2016 |
| WO | WO2016168485 A1 | 10/2016 |
| WO | WO2017106539 A1 | 6/2017 |
| WO | WO2017096152 A3 | 7/2017 |
| WO | WO2017142948 A1 | 8/2017 |

OTHER PUBLICATIONS

Schmidt et al., Gating of tactile input from the hand, Exp Brain Res, 1990, 79, pp. 97-102.
Ridder et al., Burst Spinal Cord Stimulation for Limb and Back Pain, World Neurosurgery, 2013, 9 pgs.
Fuentes et al., Spinal Cord Stimulation Restores Locomotion in Animal Models of Parkinson's Disease, Science, vol. 323, No. 5921, Mar. 20, 2009, pp. 1578-1582.
Brown et al., Impact of Deep Brain Stimulation on Upper Limb Akinesia in Parkinson's Disease, Annals of Neurology, 45, No. 4, 1999, pp. 473-488.
Bahmer et al., Effects of electrical pulse polarity shape on intra cochlear neural responses in humans: Triphasic pulses with anodic and cathodic second phase, Hearing Research, 2013, vol. 306, pp. 123-130.
Bahmer et al., Application of triphasic pulses with adjustable phase amplitude ratio (PAR) for cochlear ECAP recording: I. Amplitude growth functions, Journal of Neuroscience Methods, Clinical Neuroscience, 2012, vol. 205, pp. 202-211.
Shepherd et al., Electrical stimulation of the auditory nerve: II. Effect of stimulus waveshape on single fibre response properties, Hearing Research, 1999, 130, 171-188.
Mens, Lucas, Advances in Cochlear Implant Telemetry: Evoked Neural Responses, Electrical Field Imaging, and Technical Integrity, Trends in Amplification, vol. 11, No. 3, Sep. 2007 143-159.

* cited by examiner

NEURAL STIMULATION FOR REDUCED ARTEFACT

CROSS-REFERENCE TO RELATED APPLICATIONS

The current application is a continuation of U.S. patent application Ser. No. 17/510,264 filed Oct. 25, 2021 and issued Nov. 28, 2023 as U.S. Pat. No. 11,826,156, which is a continuation of U.S. patent application Ser. No. 16/311,526 filed Dec. 19, 2018 and issued Nov. 23, 2021 as U.S. Pat. No. 11,179,091, which is a national stage of PCT Application No. PCT/AU2017/050647 filed Jun. 23, 2017, which claims the benefit of Australian Provisional Patent Application No. 2016902492 filed Jun. 24, 2016, the disclosures of which are hereby incorporated by reference in their entireties.

TECHNICAL FIELD

The present invention relates to neural stimulation, and in particular to a method and device configured to deliver a neural stimulus in a manner to give rise to reduced amounts of artefact so as to ease the task of recording a neural response evoked by the neural stimulus.

BACKGROUND OF THE INVENTION

Electrical neuromodulation is used or envisaged for use to treat a variety of disorders including chronic pain, Parkinson's disease, and migraine, and to restore function such as hearing and motor function. A neuromodulation system applies an electrical pulse to neural tissue in order to generate a therapeutic effect. Such a system typically comprises an implanted electrical pulse generator, and a power source such as a battery that may be rechargeable by transcutaneous inductive transfer. An electrode array is connected to the pulse generator, and is positioned close to the neural pathway(s) of interest. An electrical pulse applied to the neural tissue by an electrode causes the depolarisation of neurons, which generates propagating action potentials whether antidromic, orthodromic, or both, to achieve the therapeutic effect.

When used to relieve chronic pain for example, the electrical pulse is applied to the dorsal column (DC) of the spinal cord and the electrode array is positioned in the dorsal epidural space. The dorsal column fibres being stimulated in this way inhibit the transmission of pain from that segment in the spinal cord to the brain.

In general, the electrical stimulus generated in a neuromodulation system triggers a neural action potential which then has either an inhibitory or excitatory effect. Inhibitory effects can be used to modulate an undesired process such as the transmission of pain, or excitatory effects can be used to cause a desired effect such as the contraction of a muscle or stimulation of the auditory nerve.

The action potentials generated among a large number of fibres sum to form a compound action potential (CAP). The CAP is the sum of responses from a large number of single fibre action potentials. When a CAP is electrically recorded, the measurement comprises the result of a large number of different fibres depolarising. The propagation velocity is determined largely by the fibre diameter and for large myelinated fibres as found in the dorsal root entry zone (DREZ) and nearby dorsal column the velocity can be over 60 ms$^{-1}$. The CAP generated from the firing of a group of similar fibres is measured as a positive peak P1 in the recorded potential, then a negative peak N1, followed by a second positive peak P2. This is caused by the region of activation passing the recording electrode as the action potentials propagate along the individual fibres, producing the typical three-peaked response profile. Depending on stimulus polarity and the sense electrode configuration, the measured profile of some CAPs may be of reversed polarity, with two negative peaks and one positive peak.

Approaches proposed for obtaining a neural measurement are described by the present applicant in International Patent Publication No. WO 2012/155183, the content of which is incorporated herein by reference.

To better understand the effects of neuromodulation and/or other neural stimuli, and for example to provide a stimulator controlled by neural response feedback, it is desirable to accurately detect and record a CAP resulting from the stimulus. Evoked responses are less difficult to detect when they appear later in time than the artefact, or when the signal-to-noise ratio is sufficiently high. The artefact is often restricted to a time of 1-2 ms after the stimulus and so, provided the neural response is detected after this time window, a response measurement can be more easily obtained. This is the case in surgical monitoring where there are large distances (e.g. more than 12 cm for nerves conducting at 60 ms$^{-1}$) between the stimulating and recording electrodes so that the propagation time from the stimulus site to the recording electrodes exceeds 2 ms.

However to characterize the responses from the dorsal columns, high stimulation currents and close proximity between electrodes are required. Similarly, any implanted neuromodulation device will necessarily be of compact size, so that for such devices to monitor the effect of applied stimuli the stimulus electrode(s) and recording electrode(s) will necessarily be in close proximity. In such situations the measurement process must overcome artefact directly. However, this can be a difficult task as an observed CAP signal component in the neural measurement will typically have a maximum amplitude in the range of microvolts. In contrast a stimulus applied to evoke the CAP is typically several volts and results in electrode artefact, which manifests in the neural measurement as a decaying output of several millivolts partly or wholly contemporaneously with the CAP signal, presenting a significant obstacle to isolating or even detecting the much smaller CAP signal of interest.

For example, to resolve a 10 µV CAP with 1 µV resolution in the presence of an input 5 V stimulus, for example, requires an amplifier with a dynamic range of 134 dB, which is impractical in implant systems. As the neural response can be contemporaneous with the stimulus and/or the stimulus artefact, CAP measurements present a difficult challenge of measurement amplifier design. In practice, many non-ideal aspects of a circuit lead to artefact, and as these mostly have a decaying exponential appearance that can be of positive or negative polarity, their identification and elimination can be laborious.

The difficulty of this problem is further exacerbated when attempting to implement CAP detection in an implanted device. Typical implants have a power budget which permits a limited number, for example in the hundreds or low thousands, of processor instructions per stimulus, in order to maintain a desired battery lifetime. Accordingly, if a CAP detector for an implanted device is to be used regularly (e.g. once a second), then care must be taken that the detector should consume only a small fraction of the power budget.

Daly (U.S. Pat. No. 8,454,529) suggests application of a stimulus, followed by a compensatory pulse, however Daly's biphasic stimulus and compensatory pulse together are not charge balanced and thus cause a net charge transfer between the device and the tissue.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood that the element may be any one of the listed options, or may be any combination of two or more of the listed options.

SUMMARY OF THE INVENTION

According to a first aspect, the present invention provides a method of evoking and detecting a neural response, the method comprising:
applying a stimulus to evoke a neural response, the stimulus comprising at least three stimulus components, each stimulus component comprising at least one of a temporal stimulus phase and a spatial stimulus pole, wherein a first stimulus component delivers a first charge which is unequal to a third charge delivered by a third stimulus component, the first charge and third charge being selected so as to give rise to reduced artefact at recording electrodes;
using the recording electrodes to obtain a recording of the neural response; and
detecting the neural response in the recording with a vector detector;
wherein a correlation delay of the vector detector, and the first charge and third charge of the stimulus, have values which cause a produced artefact vector to be non-parallel to an evoked neural response vector.

According to a second aspect the present invention provides an implantable device for delivering a neural stimulus, the device comprising:
an array of electrodes comprising at least one nominal stimulus electrode and at least one nominal recording electrode; and
a processor configured to cause the at least one nominal stimulus electrode to apply a stimulus to evoke a neural response, the stimulus comprising at least three stimulus components, each stimulus component comprising at least one of a temporal stimulus phase and a spatial stimulus pole, wherein a first stimulus component delivers a first charge which is unequal to a third charge delivered by a third stimulus component, the first charge and third charge being selected so as to give rise to reduced artefact at recording electrodes, the processor further configured to cause the at least one nominal recording electrode to obtain a recording of the neural response, the processor further configured to detect the neural response in the recording with a vector detector;
wherein a correlation delay of the vector detector, and the first charge and third charge of the stimulus, have values which cause a produced artefact vector to be non-parallel to an evoked neural response vector.

According to a third aspect the present invention provides a non-transitory computer readable medium for delivering a neural stimulus, comprising instructions which, when executed by one or more processors, causes performance of the following:
applying a stimulus to evoke a neural response, the stimulus comprising at least three stimulus components, each stimulus component comprising at least one of a temporal stimulus phase and a spatial stimulus pole, wherein a first stimulus component delivers a first charge which is unequal to a third charge delivered by a third stimulus component, the first charge and third charge being selected so as to give rise to reduced artefact at recording electrodes;
using the recording electrodes to obtain a recording of the neural response; and
detecting the neural response in the recording with a vector detector;
wherein a correlation delay of the vector detector, and the first charge and third charge of the stimulus, have values which cause a produced artefact vector to be non-parallel to an evoked neural response vector.

The first to third aspects of the invention recognise that suitable adjustments to or selection of the inequality or duty ratio between the first charge and third charge can cause an artefact vector to be non-parallel to, and more preferably substantially orthogonal to, an evoked neural response vector, so that a contribution of artefact to the output of the vector detector passes a zero, thereby considerably improving observation of the evoked neural response.

Some embodiments of the invention may utilise static predefined values for the inequality or duty ratio between the first charge and third charge and for the correlation delay of the vector detector. However, other embodiments may adaptively adjust the stimulus duty ratio and/or correlation delay in order to seek out a zero in the artefact contribution. Such adaptive embodiments provide a means by which to repeatedly or continually optimise the reduction of artefact observed in the recording.

In embodiments where the stimulus components comprise stimulus phases and the stimulus is a triphasic stimulus, the first charge preferably exceeds the third charge. In such embodiments the first charge is preferably between 0.51 and 0.99 times the magnitude of the second charge, more preferably between 0.6 and 0.9 times the magnitude of the second charge, more preferably between 0.65 and 0.8 times the magnitude of the second charge, and most preferably about 0.75 times the magnitude of the second charge.

Embodiments of the first to third aspects may utilise any suitable vector detector. The vector detector may for example utilise a four-lobed or five-lobed matched filter template in accordance with the teachings of the present applicant's International Patent Publication No. WO2015074121, the content of which is incorporated herein by reference. Alternatively, the detector which produces a signed output may utilise an alternative matched filter template such as a two-lobed or three-lobed matched filter template, the lobes being sinusoidal or matched to two or three lobes of a synthesised or actual measured compound action potential profile or otherwise suitably shaped.

Some embodiments of the invention recognise that while adjusting a delay T in the detector correlation permits the evoked response vector to be desirably aligned (as described in relation to FIG. 7 of WO2015074121 for example), separately adjusting the inequality or duty ratio between the first and third phase of a triphasic stimulus permits independent control over the artefact vector, so that the artefact vector may be controlled to occur non-parallel to the evoked response vector, and more preferably so that the artefact vector is controlled to occur largely or substantially orthogonal to the evoked response vector.

In some embodiments the at least three stimulus components are temporal stimulus phases of a bipolar stimulus delivered by two stimulus electrodes. Additionally or alternatively, the at least three stimulus components may comprise spatial stimulus poles of a biphasic tripolar stimulus delivered by three stimulus electrodes, each stimulus pole defined herein as representing the charge transfer between the respective stimulus electrode and the surrounding tissue.

In some embodiments of the first to third aspects of the invention, the stimulus might not be charge balanced, and the net charge difference can be recovered by alternative means such as passively recovering charge by shorting one or more electrodes to ground at appropriate times.

According to a fourth aspect the present invention provides a method of delivering a neural stimulus, the method comprising:
  delivering a first stimulus phase and a third stimulus phase which are of a first polarity;
  delivering a second stimulus phase which is of a second polarity opposite the first polarity, after the first stimulus phase and prior to the third stimulus phase;
  wherein the first to third phases are charge balanced, and wherein the first stimulus phase delivers a first charge which is unequal to a third charge delivered by the third stimulus phase, the first charge and third charge being selected so as to give rise to reduced artefact.

According to a fifth aspect the present invention provides an implantable device for delivering a neural stimulus, the device comprising:
  an array of electrodes comprising at least one nominal stimulus electrode and at least one nominal sense electrode; and
  a processor configured to cause the at least one nominal stimulus electrode to deliver a first stimulus phase and a third stimulus phase which are of a first polarity, and to deliver a second stimulus phase which is of a second polarity opposite the first polarity and which is delivered after the first stimulus phase and prior to the third stimulus phase, wherein the first to third phases are charge balanced, and wherein the first stimulus phase delivers a first charge which is unequal to a third charge delivered by the third stimulus phase, the first charge and third charge being selected so as to give rise to reduced artefact at the at least one nominal sense electrode.

According to a sixth aspect the present invention provides a non-transitory computer readable medium for delivering a neural stimulus, comprising instructions which, when executed by one or more processors, causes performance of the following:
  delivering a first stimulus phase and a third stimulus phase which are of a first polarity;
  delivering a second stimulus phase which is of a second polarity opposite the first polarity, after the first stimulus phase and prior to the third stimulus phase;
  wherein the first to third phases are charge balanced, and wherein the first stimulus phase delivers a first charge which is unequal to a third charge delivered by the third stimulus phase, the first charge and third charge being selected so as to give rise to reduced artefact.

The first charge may be made unequal to the third charge by causing the first and third stimulus phases to have unequal current amplitude, and/or unequal duration, and/or unequal morphology.

In embodiments of the fourth to sixth aspects of the invention a peak-to-peak detector may be used to process the recording. While a peak-to-peak detector does not go through a zero irrespective of the duty ratio between the first charge and third charge, suitable adjustments of the duty ratio between the first charge and third charge nevertheless permit a minima in the detector output to be sought thus providing a means by which to give rise to reduced artefact in the recording.

In alternative embodiments the described stimulus of the first through sixth aspects may be delivered in the absence of any related ECAP recording, for example in order to preserve desirable electrical tissue conditions until such time as an ECAP measurement might later be desired.

BRIEF DESCRIPTION OF THE DRAWINGS

An example of the invention will now be described with reference to the accompanying drawings, in which.

DESCRIPTION OF THE PREFERRED EMBODIMENTS

Figure 1:
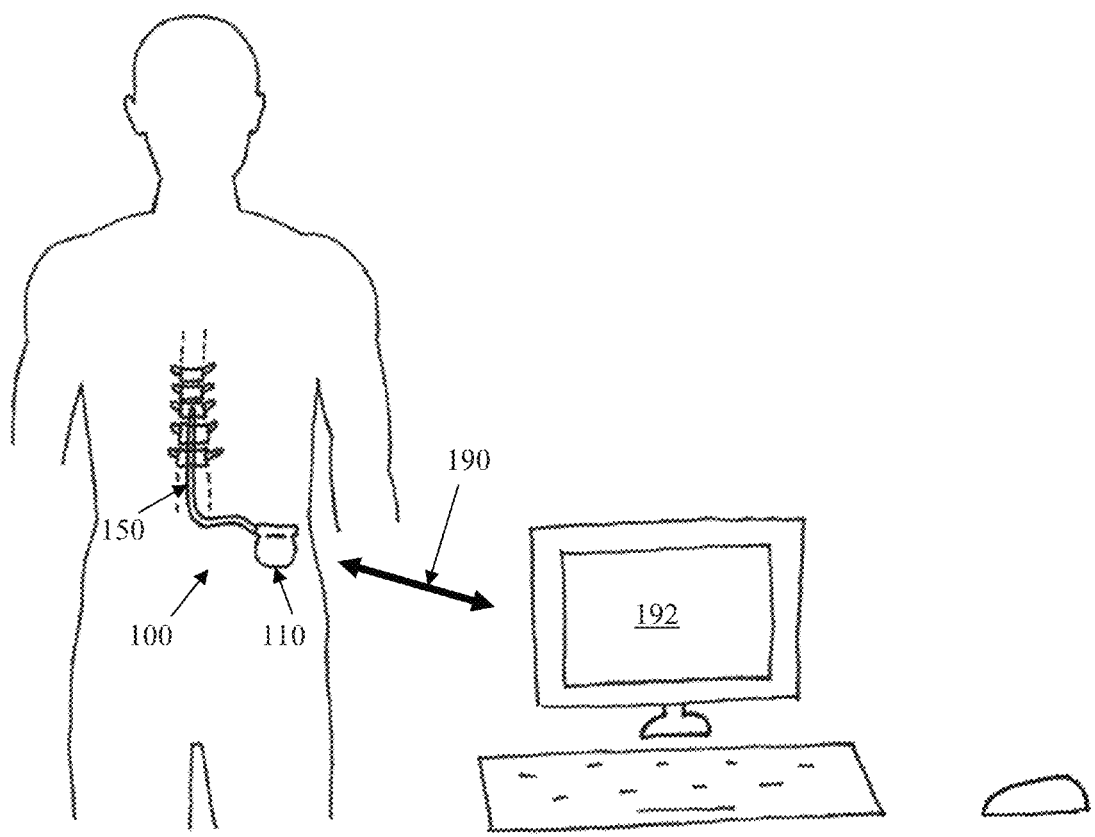
FIG. 1 schematically illustrates an implanted spinal cord stimulator.

FIG. 1 schematically illustrates an implanted spinal cord stimulator 100. Stimulator 100 comprises an electronics module 110 implanted at a suitable location in the patient's lower abdominal area or posterior superior gluteal region, and an electrode assembly 150 implanted within the epidural space and connected to the module 110 by a suitable lead. Numerous aspects of operation of implanted neural device 100 are reconfigurable by an external control device 192.

Moreover, implanted neural device 100 serves a data gathering role, with gathered data being communicated to external device 192.

Figure 2:
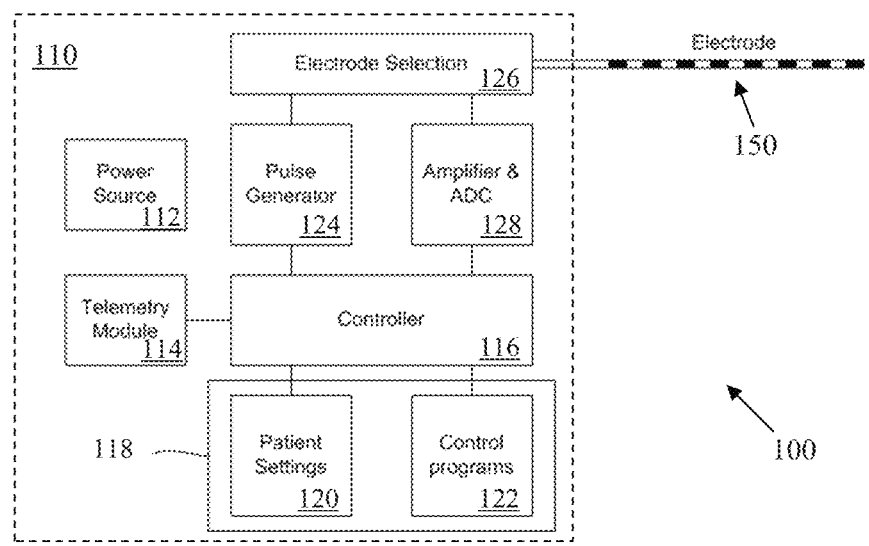
FIG. 2 is a block diagram of the implanted neurostimulator.

FIG. 2 is a block diagram of the implanted neurostimulator 100. Module 110 contains a battery 112 and a telemetry module 114. In embodiments of the present invention, any suitable type of transcutaneous communication 190, such as infrared (IR), electromagnetic, capacitive and inductive transfer, may be used by telemetry module 114 to transfer power and/or data between an external device 192 and the electronics module 110.

Module controller 116 has an associated memory 118 storing patient settings 120, control programs 122 and the like. Controller 116 controls a pulse generator 124 to generate stimuli in the form of current pulses in accordance with the patient settings 120 and control programs 122. Electrode selection module 126 switches the generated pulses to the appropriate electrode(s) of electrode array 150, for delivery of the current pulse to the tissue surrounding the selected electrode(s). Measurement circuitry 128 is configured to capture measurements of neural responses sensed at sense electrode(s) of the electrode array as selected by electrode selection module 126.

Figure 3:
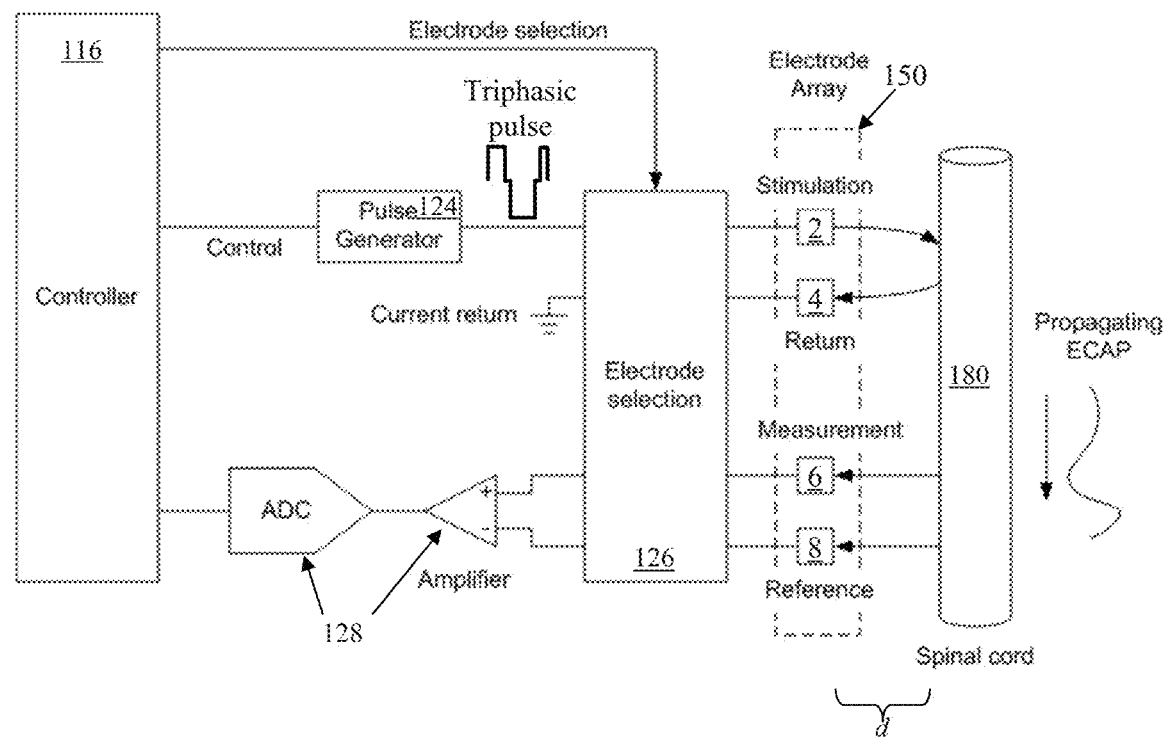
FIG. 3 is a schematic illustrating interaction of the implanted stimulator with a nerve.

FIG. 3 is a schematic illustrating interaction of the implanted stimulator 100 with a nerve 180, in this case the spinal cord however alternative embodiments may be positioned adjacent any desired neural tissue including a peripheral nerve, visceral nerve, parasympathetic nerve or a brain structure. Electrode selection module 126 selects a stimulation electrode 2 of electrode array 150 to deliver a triphasic electrical current pulse to surrounding tissue including nerve 180, although other embodiments may additionally or alternatively deliver a biphasic tripolar stimulus. Electrode selection module 126 also selects a return electrode 4 of the array 150 for stimulus current recovery to maintain a zero net charge transfer.

Delivery of an appropriate stimulus to the nerve 180 evokes a neural response comprising a compound action potential which will propagate along the nerve 180 as illustrated, for therapeutic purposes which in the case of a spinal cord stimulator for chronic pain might be to create paraesthesia at a desired location. To this end the stimulus electrodes are used to deliver stimuli at 30 Hz. To fit the device, a clinician applies stimuli which produce a sensation that is experienced by the user as a paraesthesia. When the paraesthesia is in a location and of a size which is congruent with the area of the user's body affected by pain, the clinician nominates that configuration for ongoing use.

The device 100 is further configured to sense the existence and electrical profile of compound action potentials (CAPs) propagating along nerve 180, whether such CAPs are evoked by the stimulus from electrodes 2 and 4, or otherwise evoked. To this end, any electrodes of the array 150 may be selected by the electrode selection module 126 to serve as measurement electrode 6 and measurement reference electrode 8. The stimulator case may also be used as a measurement or reference electrode, or a stimulation electrode. Signals sensed by the measurement electrodes 6 and 8 are passed to measurement circuitry 128, which for example may operate in accordance with the teachings of International Patent Application Publication No. WO2012155183 by the present applicant, the content of which is incorporated herein by reference. The present invention recognises that in circumstances such as shown in FIG. 3 where the recording electrodes are close to the site of stimulation, stimulus artefact presents a significant obstacle to obtaining accurate recordings of compound action potentials, but that reliable accurate CAP recordings are a key enabler for a range of neuromodulation techniques.

Figure 4:
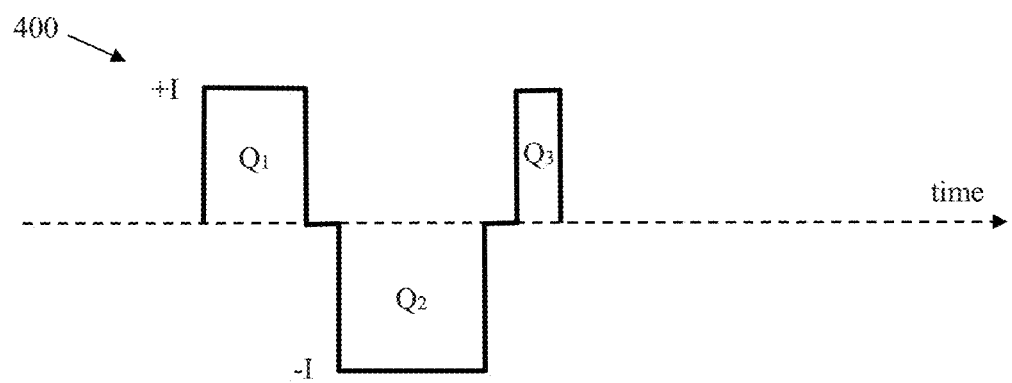
FIG. 4 illustrates the current profile of a triphasic stimulus, having unequal phase durations, in accordance with some embodiments of the invention.

To this end the present embodiment of the present invention provides for delivering such neural stimulation in a manner which gives rise to reduced artefact, the method being based on triphasic and/or tripolar stimulus waveforms. FIG. 4 illustrates the general current profile of a suitable triphasic stimulus 400 for implementing the present invention in some embodiments of the invention. The stimulus 400 delivers a positive charge transfer of Q1 and Q3 in the first and third phases respectively. A negative charge transfer of Q2 is delivered in the second phase. In accordance with the present invention the stimulus 400 is charge balanced, so that $|Q2|=Q1+Q3$. In accordance with the present invention $Q1 \neq Q3$, with the respective values of Q1 and Q3 being selected in a manner which minimises artefact. This is achieved by delivering all three phases at the same magnitude I, but for differing durations. In this embodiment the duration of the first phase is 0.75 times the duration of the second phase, so that $Q1=0.75\ Q2$. The duration of the third phase is 0.25 times the duration of the second phase, so that $Q3=0.25\ Q2$. The inventors have determined that a first phase to third phase charge ratio of 0.75:0.25 proves to be a particularly robust setting for Q1 and Q3, even between different devices and different human subjects. However the duty ratio of the first and third phases can be adjusted by considering a parameter $0<\alpha<1$ ($\alpha \neq 0.5$), or in preferred embodiments $0.5<\alpha<1$, whereby in accordance with the present invention $Q1=\alpha Q2$, and $Q3=(1-\alpha)\ Q2$. The interphase gaps of stimulus 400 each may be adjusted in duration or may be omitted.

Figure 5:
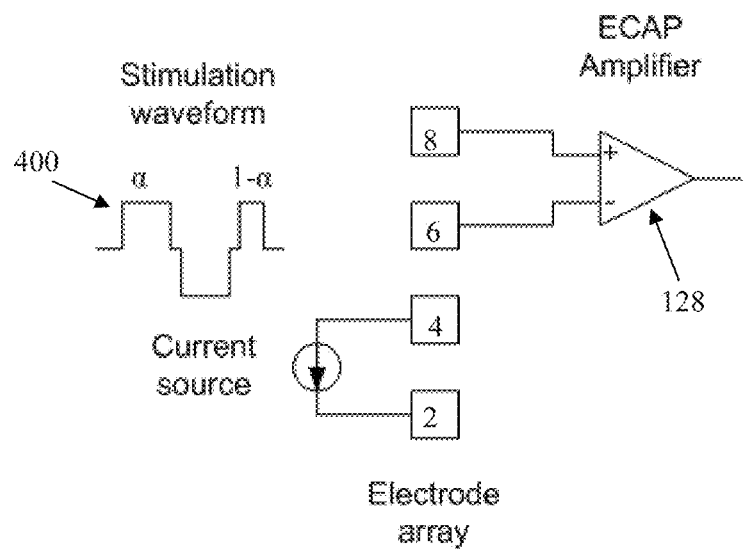
FIG. 5 schematically illustrates delivery of a stimulus to neural tissue.
Figure 6:
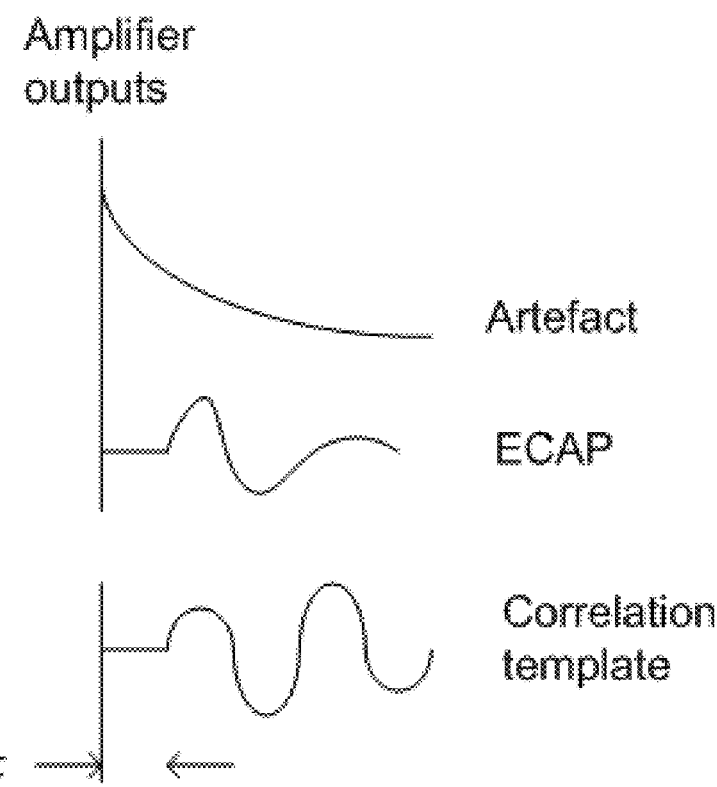
FIGS. 6 and 7 illustrate the effect of varying a detector time delay and a triphasic stimulus duty ratio.
Figure 7:
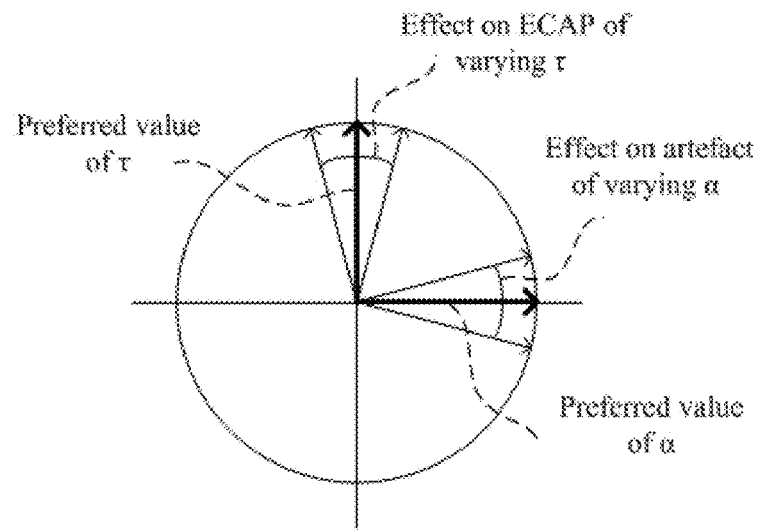

FIG. 5 schematically illustrates delivery of the stimulus 400 to the neural tissue. In a first embodiment, neural response signals observed by electrodes 6 and 8 are processed by the controller 116 using a dot-product detector, in the manner disclosed in the present applicant's International Patent Publication No. WO2015074121, the content of which is incorporated herein by reference. Beneficially, such embodiments recognise that a dot product detector produces an output that can be positive or negative depending in the relative phase of the artefact and the detector. As shown in FIGS. 6 and 7, and described more fully in WO2015074121 in relation to FIG. 7 of that publication in particular, varying a detector time delay T influences a phase angle of the observed neural response vector. The present invention further recognises that varying the duty ratio a of stimulus 400 influences the phase angle of the artefact as measured by the detector output. The parameters T and a thus provide independent control over neural response vector phase angle and artefact vector phase angle, permitting orthogonal positioning of the two vectors to be sought as shown in FIG. 7.

Figure 8:
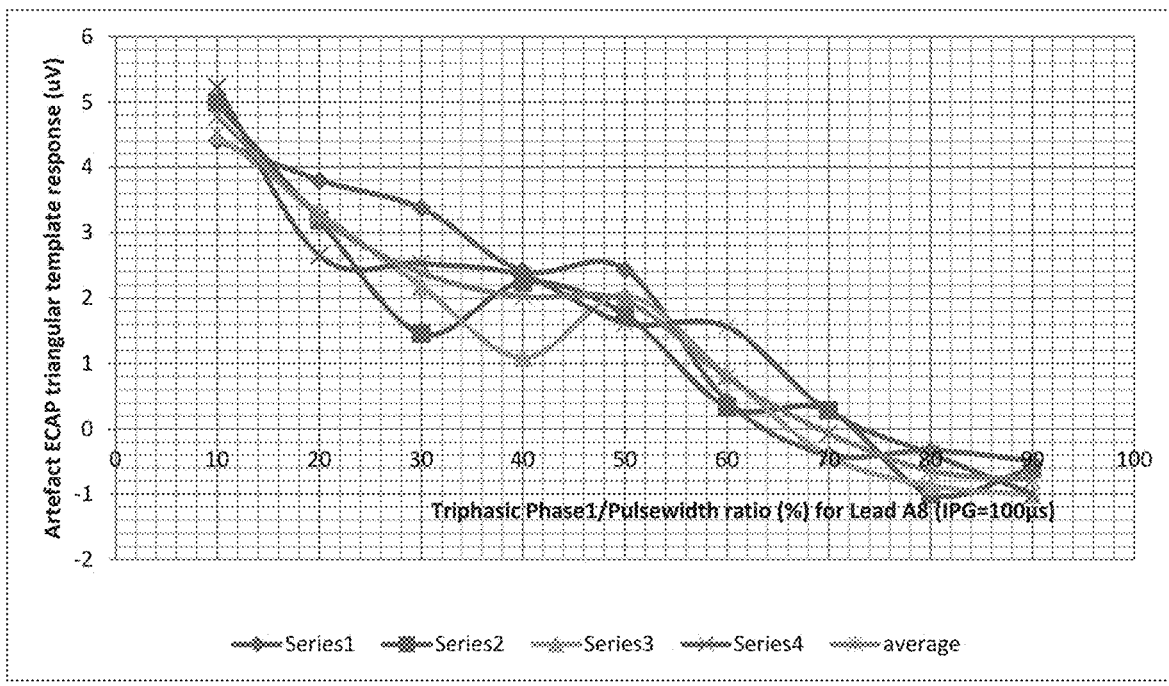
FIG. 8 illustrates the results of experimental testing of variable triphasic duty ratio.

FIG. 8 illustrates the results of experimental testing of variable triphasic duty ratio in a human subject, as observed on four different electrodes of the array. The parameter a was varied from 0.1 to 0.9 (shown as percentages on the x-axis in FIG. 8), the resulting triphasic stimulus was delivered, and the observed neural response on each of the four electrodes was processed by a dot product detector as described in WO2015074121. The output of the dot product detector is plotted in FIG. 8. It is noted that the measure of artefact produced by using a dot product detector consists of the peak-to-peak value of the equivalent ECAP that would produce the same output. FIG. 8 reveals that if 70% of the positive stimulation is in the first phase (i.e., if $\alpha=0.7$), the artefact is approximately zero, for all electrodes. Moreover, this result has shown itself to be quite robust against variation in lead type, and other stimulation parameters.

Alternative embodiments may of course select a different value of a as appropriate to compensate for different hardware or firmware settings or if required between patients.

Figure 9:
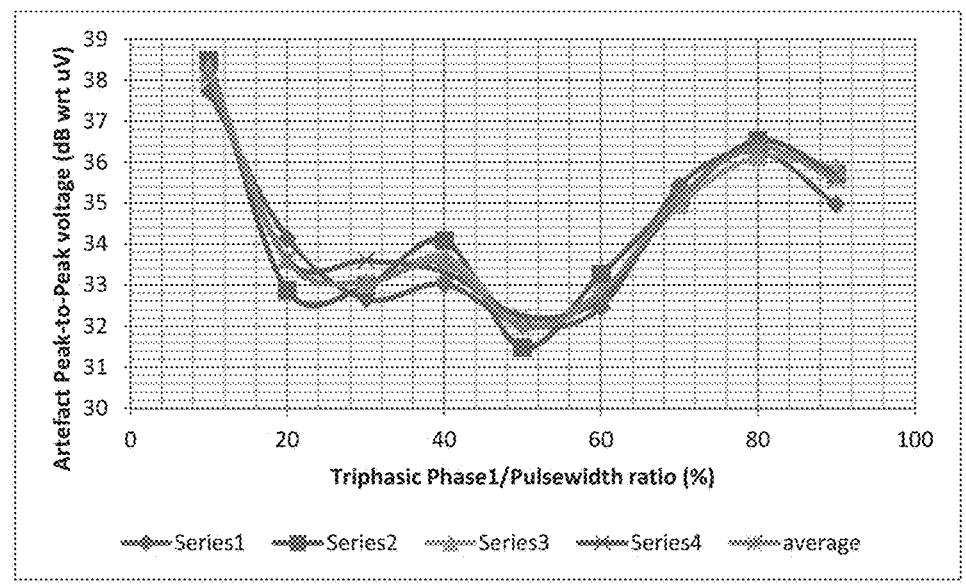
FIG. 9 shows the peak-to-peak artefact for tri-phasic stimulation.

In a second embodiment, the neural response signals observed by electrodes 6 and 8 are processed by the controller 116 using peak-to-peak detection. A peak-to-peak detector can only produce a positive value for the artefact. FIG. 9 shows the peak-to-peak artefact for tri-phasic stimulation as a function of the ratio of the first and third pulses. Again, observations were made for four different sense electrodes of the array to produce the four traces of FIG. 9.

When compared to a biphasic waveform, which has a 0% duty cycle ($\alpha=0$), extrapolating the graph of FIG. 9 would be expected to give artefact of at least 40 µV. Thus, the variable duty-cycle tri-phasic stimulation produces a trough through the range $0.2<\alpha<0.7$), which may be of assistance in some scenarios. However this trough is only a few dB lower than the peak value and so of lesser value than the embodiment of FIG. 8.

A further particular advantage of some embodiments of the present invention is that the parameter a is orthogonal to other methods of artefact reduction and thus may be used in conjunction with such other methods. These other methods include methods based in linearity, such as alternating phase and subtraction.

The alternating phase method of artefact reduction relies on the equation $A(I)=-A(-I)$, where $A(I)$ is the artefact at current I. Thus $A(I)+A(-I)=0$, so consecutive neural response measurements obtained in response to a first stimulus of one phase followed by a stimulus which is of opposite phase may reduce artefact by subtracting the consecutively obtained response measurements.

The subtraction method of artefact reduction also relies on linearity. $A(I)=2 \cdot A(I/2)$. Thus artefact reduction can also be achieved by obtaining consecutive neural response measurements in response to a first stimulus of one amplitude and a second stimulus of double the amplitude, and $A(I)-2A(I/2)=0$.

Linearity methods can provide around 20 dB of artefact rejection. In conventional neuromodulation biphasic stimulation is often used to generate evoked responses. It produces artefact having a fixed polarity compared to the stimulus so inverting the polarity of the stimulus inverts the polarity of the artefact. This leads to alternating phase stimulation where averages across successive stimuli lead to cancellation of artefact voltage but not ECAP. This works, but has its own problems e.g. reduction in ECAP size, multiple stimulation sites etc. Or slower effective stimulation rate, meaning higher power consumption per therapeutic stimulus.

The method of the present invention may additionally or alternatively be combined with artefact reduction methods which are based on detection, as described in WO2015074121 and utilised in the embodiment of FIGS. 6-8. These methods used a four-lobe detector to eliminate the DC, linear and quadratic terms from the artefact's Taylor expansion. Detection methods provide around 16 dB of artefact rejection.

The variable triphasic methods described herein when used in combination with such other artefact reduction techniques have been shown to provide a further 13 dB of artefact rejection. It will be noticed that these methods are orthogonal to each other i.e. they can be used in conjunction. It is expected that this will provide 20+16+9 dB=42 dB of artefact rejection. This can reduce a (typical large) artefact of 500 uV observed in spinal cord stimulation patients to an ECAP equivalent of 5 uV.

In yet another embodiment, the parameter a may be adaptively validated, and adjusted if required, occasionally or substantially continuously over time. In such embodiments, tri-phasic stimulation is delivered at half the therapeutic current, which allows the system to measure the artefact at the detector output in the absence of any evoked ECAP. This allows the system to dynamically adjust the duty cycle to find the null in artefact, optimized for the specific circumstances. This also allows opposite phase triphasic stimuli to be delivered beneath the recruitment threshold, in order to provide the opposite phase signal for cancellation via the linearity technique.

While the embodiment of FIG. 8 utilised the 4 lobe matched filter template described in WO2015074121, it is to be noted that alternative embodiments of the present invention may use any suitable dot-product detector, including 2- and 3-lobe matched filter dot product detectors. Such embodiments may even be preferable in some instances as they can be better at rejecting white noise or non-artefact noise than the 4-lobe dot product detector.

Figure 10A:
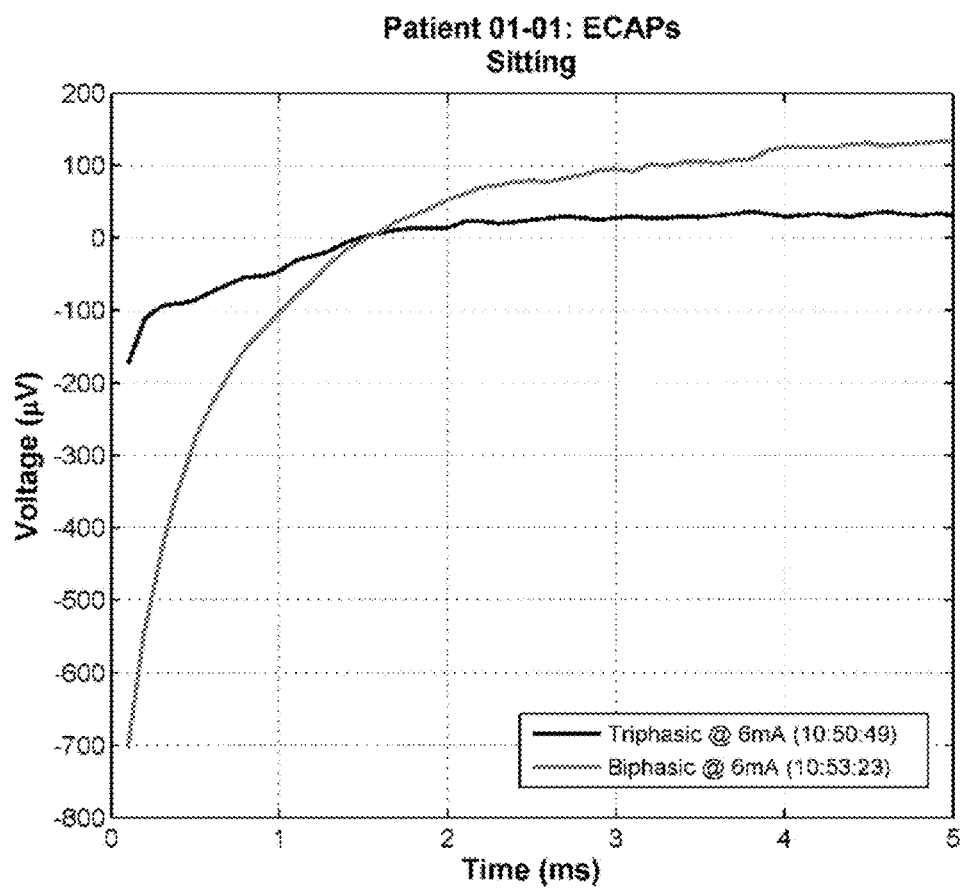
FIGS. 10a, 10b, 11a, and 11b illustrate the improved reduced artefact arising in human subject tests.
Figure 10B:
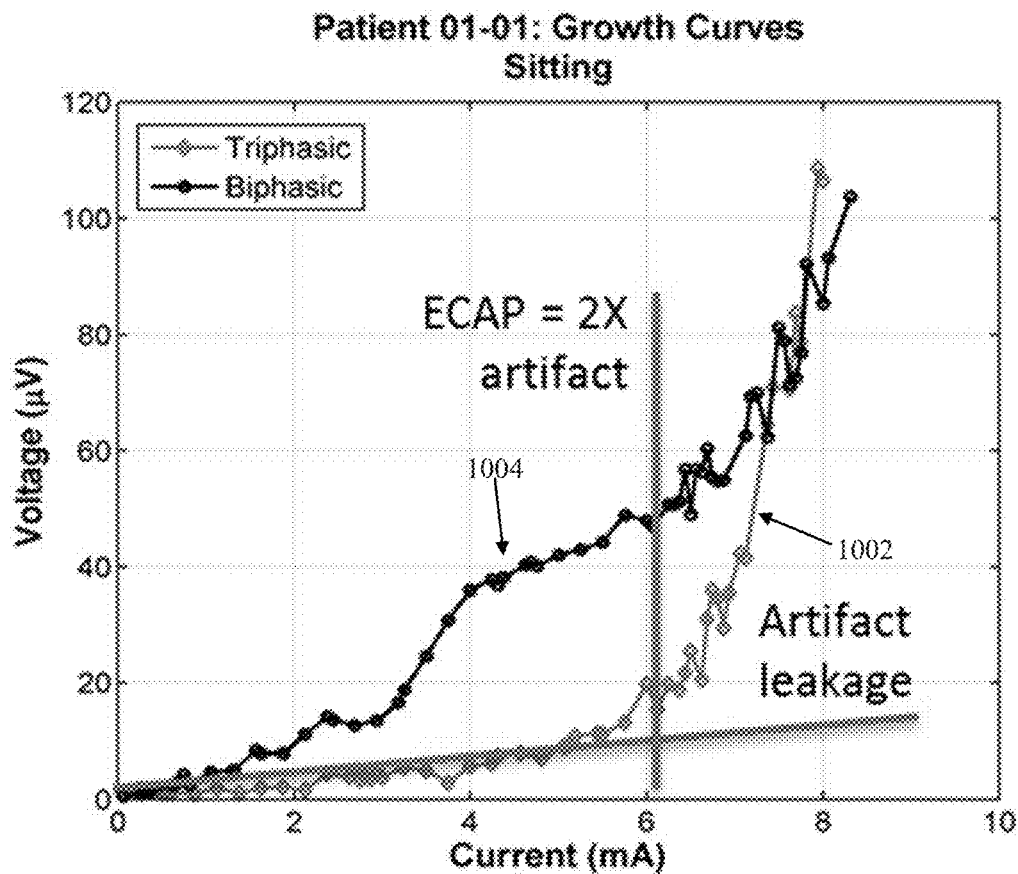
Figure 11A:
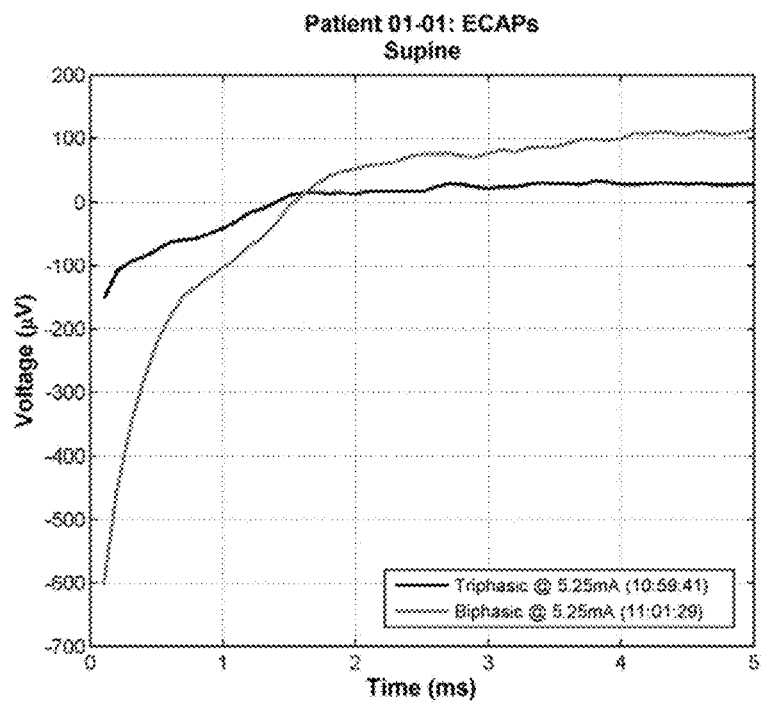
Figure 11B:
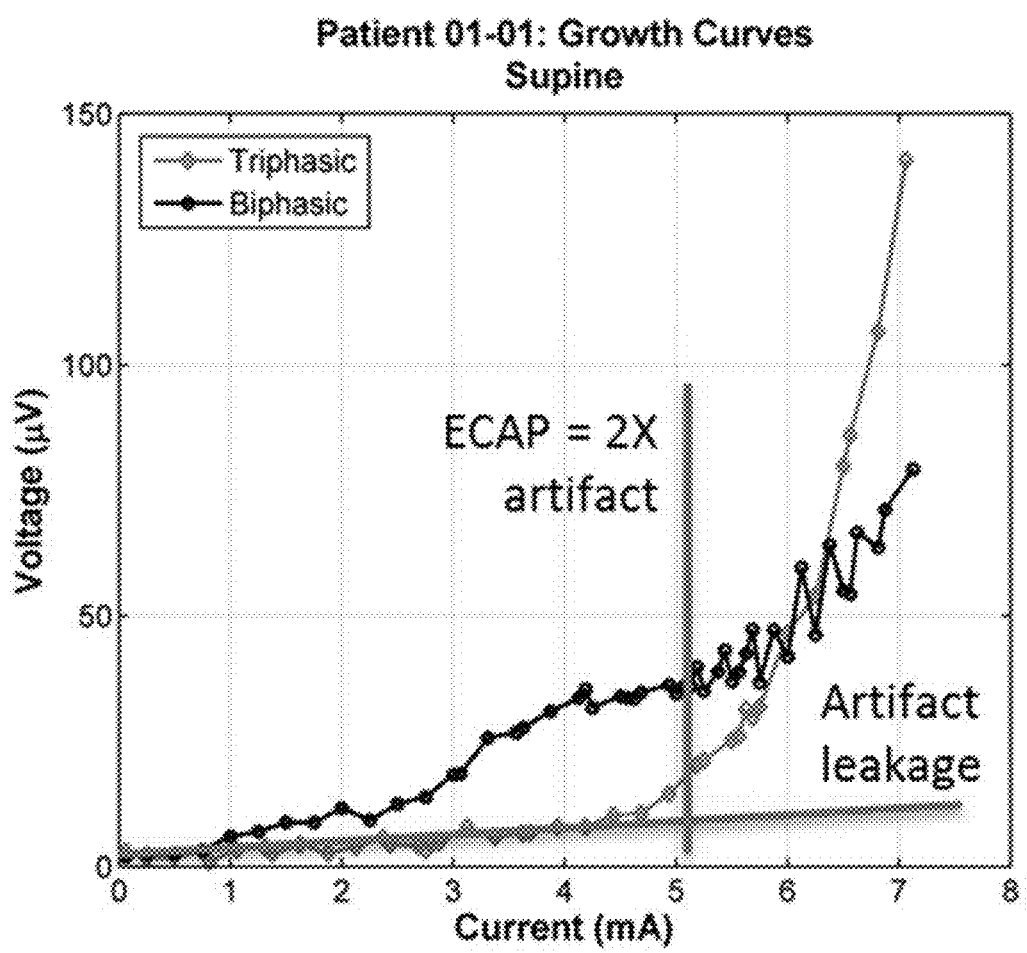

FIGS. 10-11 illustrate data obtained from a single human subject having a spinal cord stimulator utilising the embodiment of FIG. 8. In FIG. 10$a$ the artefact observed in obtained neural measurements when the subject is sitting can be seen to be substantially reduced by the triphasic stimulus in accordance with the present invention, at 6 mA stimulus current. FIG. 10$b$ shows the observed neural response amplitude plotted against varying input stimulus current from 0-8 mA, for both triphasic (1002) and biphasic (1004) stimulation for the same human subject. Below about 6 mA no compound action potential is being evoked and the observed signals comprise only artefact, with the results for biphasic stimulation clearly being much worse (larger) then the results for adjusted duty ratio triphasic stimulation in accordance with the present invention. Moreover, the stimulus threshold, above which compound action potentials are being evoked by the applied stimuli, is a critical parameter for most neuromodulation applications. The stimulus threshold is clearly manifested as a kneepoint in the plot 1002 provided by the present invention at around 6 mA stimulus current, but is far more difficult or even impossible to discern in the biphasic results 1004. Additionally, the slope of the growth curve above the stimulus threshold, another critical parameter in many neuromodulation applications, is much less affected by noise in the plot 1002 than in 1004.

FIGS. 11$a$ and 11$b$ correspond to FIG. 10, for data obtained when the subject was supine. Again, significant artefact reduction is clearly provided by the adjusted duty ratio triphasic stimulation of the present invention.

Figure 12:
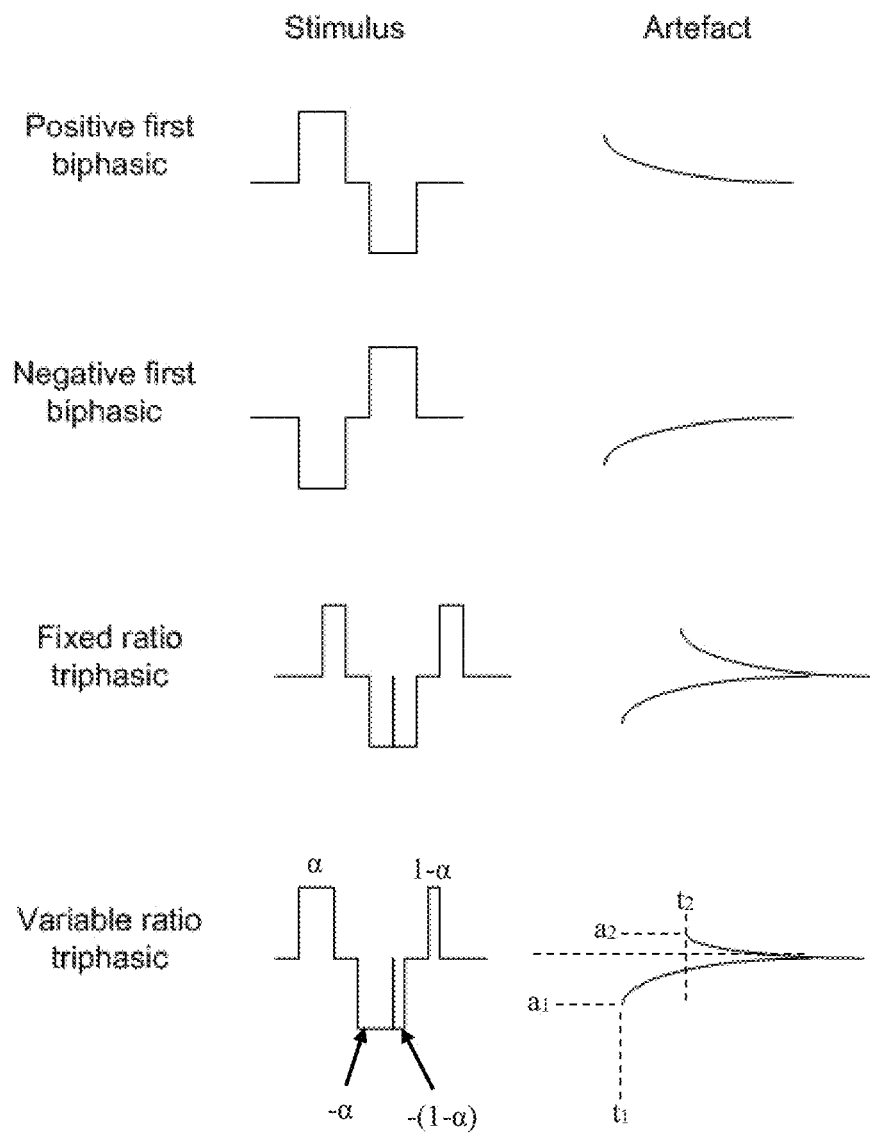
FIG. 12 illustrates a conceptualisation of some embodiments of the invention having unequal phase durations.

Without intending to be limited by theory, as shown in FIG. 12 triphasic stimulation can be compared to or conceptualised as being two biphasic stimuli in succession. So the artefact should be the electrical sum of the artefact of the individual stimuli. Due to the time delay ($t_1-t_2$) the artefact waveforms do not cancel if they arise from equal biphasic stimuli. The present invention can be thought of as giving the two bi-phasic waveforms unequal pulse widths, and/or unequal amplitude and/or an inequality of any other suitable characteristic, in a manner which makes the size of the positive and negative artefact contributions $a_1$ and $a_2$ unequal upon creation but with the intention of making them cancel once the time delay ($t_1-t_2$) provides for some decay of $a_1$.

The conceptualisation of the variable ratio triphasic stimulus shown in FIG. 12, where the second phase is conceived as two unequal duration phases with no interphase gap, suggests a further suite of embodiments which are also within the scope of the invention. In such embodiments, an interphase gap is introduced to effectively split the second phase into two phases. Such embodiments thus include stimulus waveforms that comprise more than three phases. In the case of a four phase stimulus the charge delivered by each phase in such embodiments could for example be configured to be $\alpha$, $-\alpha$, $-(1-\alpha)$, $+(1-\alpha)$, respectively, as is immediately suggested by FIG. 12. However, the use of four phases permits other variations in the charges delivered by each phase, so that more generally the charges delivered by each phase could comprise +X μC, −Y μC, −Z μC, and +(Y+Z−X) μC, respectively, with each phase being temporally separated from the adjacent phase by brief interphase gaps each being of any suitable value, and such embodiments are within the present invention provided that the values of $\alpha$, X, Y and Z are selected so as to accomplish the required charge balancing and reduction in artefact experienced by the recording electrodes.

Figure 13:
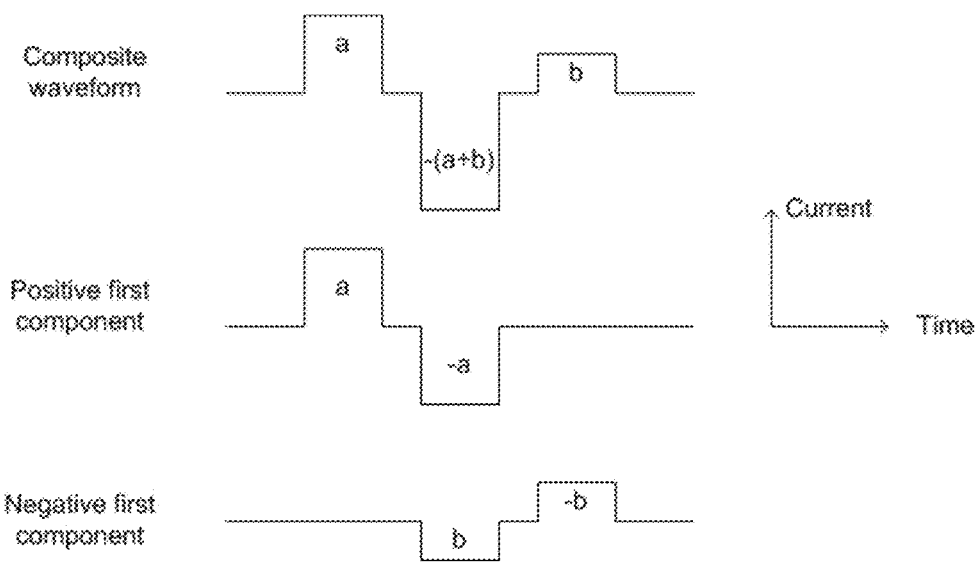
FIG. 13 illustrates the current profile of a triphasic stimulus, having unequal phase amplitudes, in accordance with other embodiments of the invention

Considering yet another embodiment, shown in FIG. 13, it is noted that adjusting the amplitude of the waveform, but not the pulse width, also provides for a suitable triphasic waveform to be produced. The stimulus waveform of FIG. 13 can, similarly to FIG. 12, be seen as the sum of two biphasic waveforms that will have opposite artefact. By adjusting the amplitudes a and b, while keeping (a+b) at the required charge to achieve a desired therapeutic effect, the artefact terms of the two sub-components will be expected to cancel in the corresponding manner as shown in FIG. 12.

It is to be appreciated that in still other embodiments, the unequal phase amplitude approach of FIG. 13 may be combined with the unequal phase duration amplitude approach of FIGS. 4 and 12.

Figure 14A:
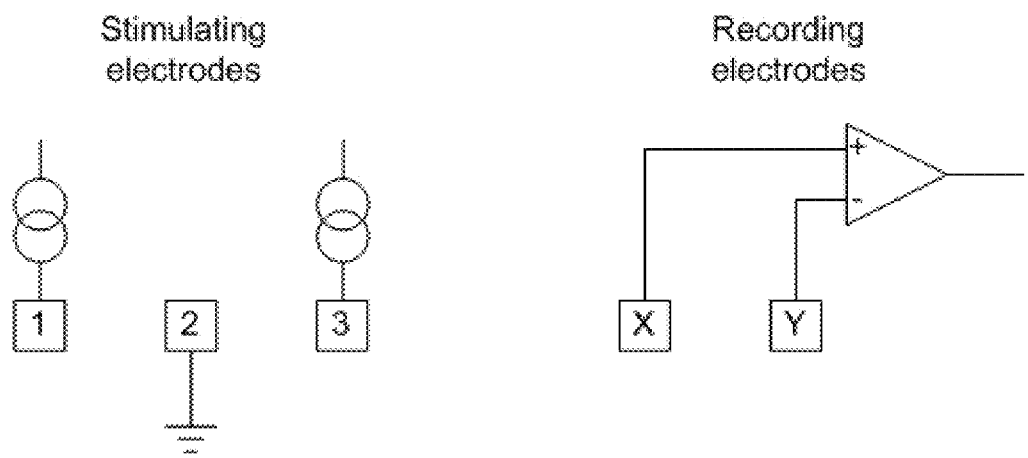
FIGS. 14a and 14b illustrate the spatial electrode configuration, and the tripolar stimulus, respectively, in accordance with another embodiment of the invention.
Figure 14B:
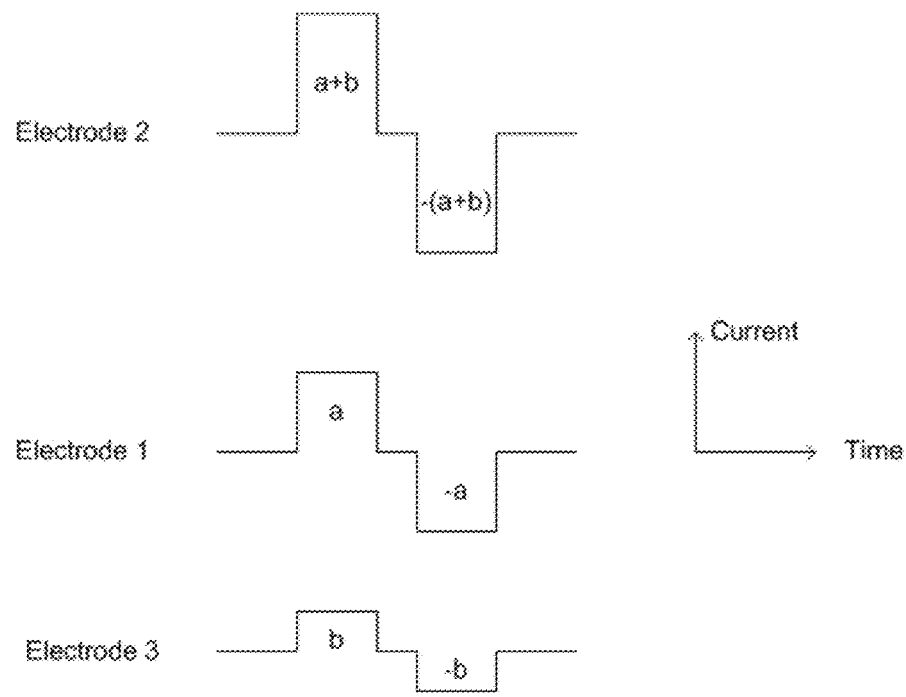

In still other embodiments, a tripolar stimulus may be applied in the manner shown in FIGS. 14a and 14b. The spatial positioning of the electrodes, as shown in FIG. 14a, can be exploited by appropriately configured current pulses as shown in FIG. 14b. The waveforms on electrode 2 and 3 will have artefact of opposite polarity. Again, by adjusting the amplitudes a and b, while keeping (a+b) at the required charge, the artefact terms of the two sub-components will be expected to cancel spatially at some point, and can be configured to preferentially cancel artefact at the known nearby location of the recording electrodes.

Figure 15:
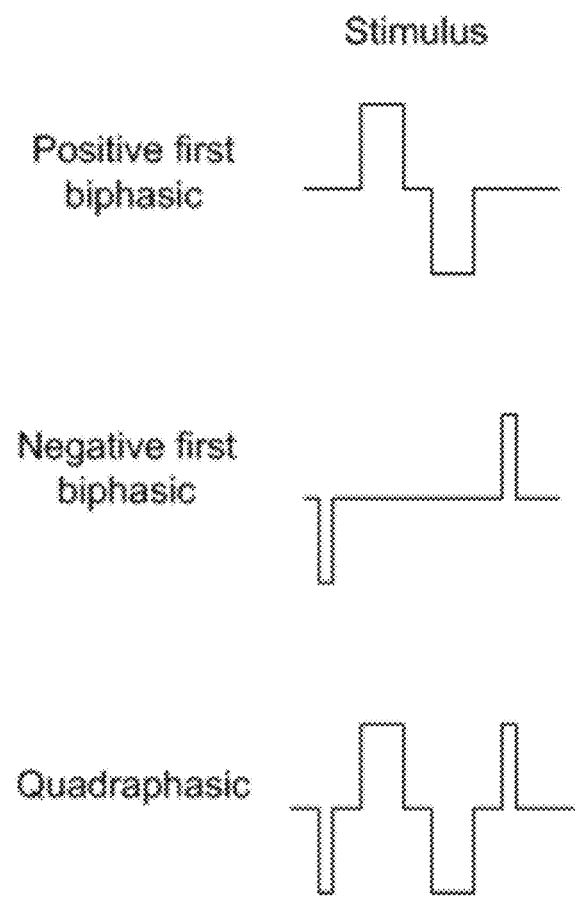
FIG. 15 illustrates derivation of, and the final form of, a quadraphasic stimulus in accordance with another embodiment of the invention.

FIG. 15 illustrates application of the principles of the present invention in order to yield yet another stimulus waveform in accordance with another embodiment of the present invention. In this embodiment, a quadraphasic stimulus is formulated from two components; a positive-first biphasic pulse, and a negative-first biphasic pulse comprising a long interphase gap. The positive-first biphasic pulse component effects the neural stimulus. The negative-first biphasic pulse component provides no stimulation, in that it does not evoke any neural response. The negative-first biphasic pulse does however introduce an artefact, dominated by the second phase, which, when the relative charges of all four phases are suitably chosen, cancels the artefact arising from the positive-first biphasic component in a corresponding manner as is shown in FIG. 12.

Figure 16:
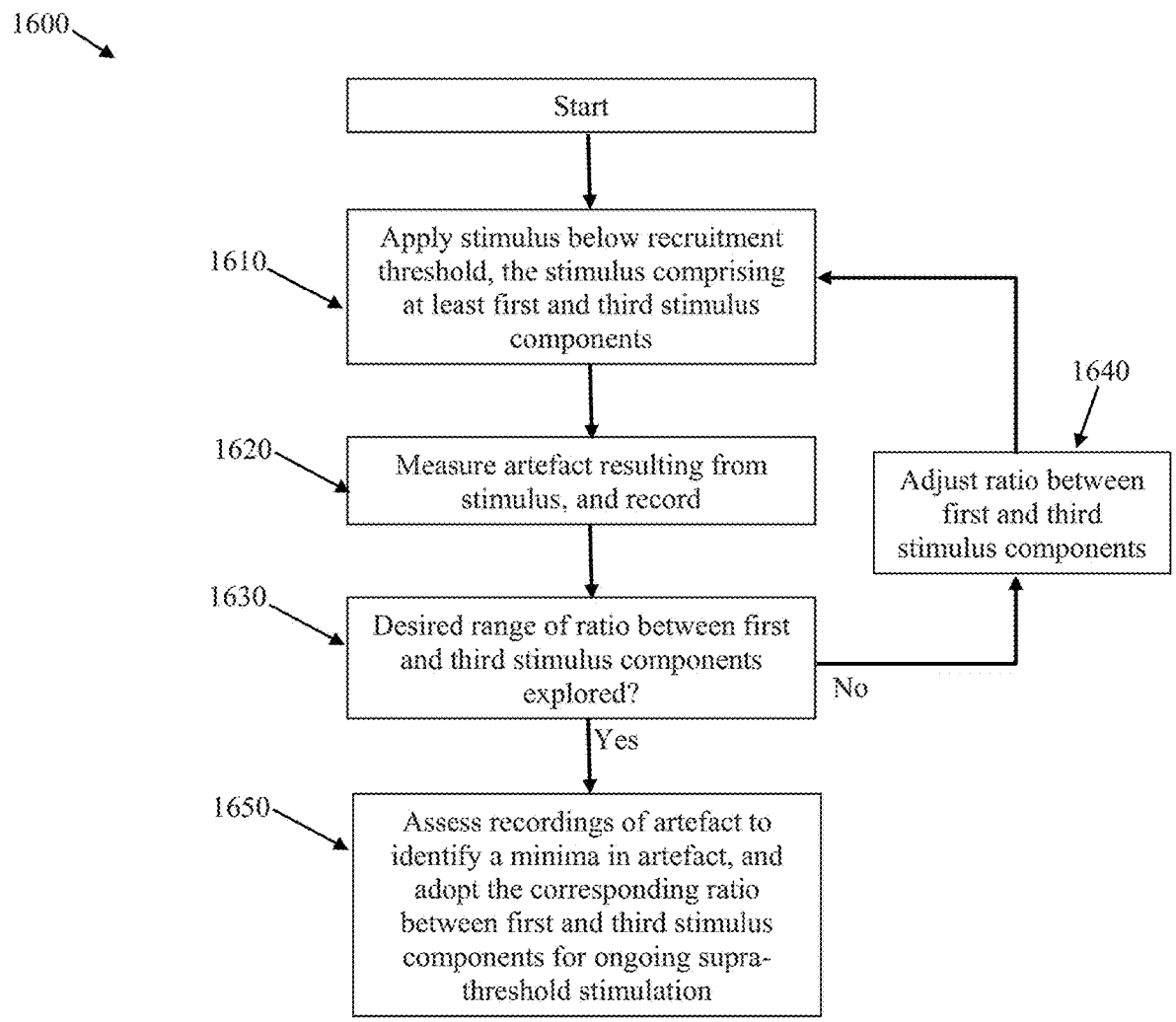
FIG. 16 illustrates a process for optimising a stimulation waveform and/or configuration in order to minimise artefact.

FIG. 16 illustrates a process 1600 for optimising a stimulation waveform and/or configuration in order to minimise artefact. At 1610 a stimulus is applied, below a threshold for neural recruitment so as to ensure that neural responses are not evoked and do not contribute to measurements. At 1620, artefact resulting from the stimulus is measured and recorded. At 1640, the ratio between the first and third stimulus components is adjusted, and the steps 1610 and 1620 are repeated as many times as desired, in order to explore a desired range of the ratio between the first and third stimulus components. For example, the ratio may be adjusted from 0 to 1 in increments of 0.01. Once step 1630 determines that the desired range of ratios between the first and third stimulus components has been explored, the process passes on to step 1650, where the minima in artefact is identified from all the recordings. The ratio which gave rise to that minimum artefact is then adopted for ongoing stimulation at supra-threshold therapeutic levels. A similar approach may be used to identify optimal ratios of any or all stimulus components, such as the charge delivered by respective phases and/or by respective electrodes in monopolar, bipolar, tripolar or more than three pole stimulation configurations, whether delivering monophasic, biphasic, triphasic or more than triphasic stimulation, and/or may be used to identify optimal ratios of stimulation phase amplitudes, stimulation phase widths, and stimulation pulse shapes. Process 1600, or a suitable adaptation thereof, may be executed or controlled by device 192 to identify such optimal ratios on a static basis, such as once during a post-implantation device programming stage, or only upon occasions of clinical input. Alternatively, process 1600, or a suitable adaptation thereof, may be executed by controller 116 on a preprogrammed or prompted basis, without involvement of device 192 or any clinician, in order to identify such optimal ratios on a dynamic or ongoing basis at suitable times throughout operation of the device. Such suitable times for execution of process 1600 may be each occasion upon which the device 110 detects changed stimulation conditions, such as a postural change of the implant recipient.

The claimed and described electronic functionality can be implemented by discrete components mounted on a printed circuit board, or by a combination of integrated circuits, or by an application-specific integrated circuit (ASIC).

It will be appreciated by persons skilled in the art that numerous variations and/or modifications may be made to the invention as shown in the specific embodiments without departing from the spirit or scope of the invention as broadly described. For example, while FIG. 4 illustrates adjustment of triphasic duty ratio by altering a duration of the first and third phases, such adjustments may additionally or alternatively be effected by altering phase current amplitudes. Moreover, the triphasic stimulus may comprise rectangular phases as shown or may comprise phases of sinusoidal, stepped, triangular or any other suitable profile. While a range of triphasic, tripolar and quadraphasic stimuli have been discussed, it is to be appreciated that the described principles of the present invention may be adapted and applied to formulate stimuli having a larger number of phases or poles which nevertheless achieve the aim of reducing artefact and such stimuli are also within the scope of the present invention, and in particular the first stimulus component as defined herein is to be understood to encompass a stimulus component which temporally arises after other components of a multiphasic stimuli, and the third stimulus component as defined herein is to be understood to encompass a stimulus component which may arise prior to, be contemporaneous with, or arise after, the first stimulus component. Moreover, the first stimulus component and the third stimulus component as defined herein are further to be understood to encompass stimulus components which have zero, one, or more other stimulus components physically or temporally interposed between the first stimulus component and the third stimulus component. The present embodiments are, therefore, to be considered in all respects as illustrative and not limiting or restrictive.

The invention claimed is:

1. An implantable device for delivering a neural stimulus, the device comprising:
an array of electrodes; and
a processor configured to:
cause a first electrode of the array to deliver a first stimulus component of the neural stimulus and a third electrode of the array to deliver a third stimulus component of the neural stimulus simultaneously with the first stimulus component, the first stimulus component and the third stimulus component being of a first polarity, and
cause a second electrode of the array in between the first electrode and the third electrode to deliver a second stimulus component of the neural stimulus simultaneously with the first stimulus component and the third stimulus component, the second stimulus component being of a second polarity opposite the first polarity,
wherein the first, second, and third stimulus components are charge balanced, and
wherein the first stimulus component delivers a first charge which is unequal to a third charge delivered by the third stimulus component, the second stimulus component delivers a second charge, and the first charge and the third charge are selected so as to give rise to reduced artefact.

2. The implantable device of claim 1, further comprising:
measurement circuitry configured to obtain a recording of a response to the neural stimulus at at least one sense electrode of the array;
wherein the processor is further configured to detect a neural response in the recording with a vector detector; and
wherein the first charge and the third charge of the neural stimulus have values that cause an artefact vector produced by the vector detector to be non-parallel to an evoked neural response vector produced by the vector detector.

3. The implantable device of claim 2, wherein the inequality between the first charge and the third charge causes the artefact vector to be substantially orthogonal to the evoked neural response vector.

4. The implantable device of claim 2, wherein a correlation delay of the vector detector and a stimulus duty ratio of the first charge to the second charge of the neural stimulus have values which cause the artefact vector to be non-parallel to the evoked neural response vector.

5. The implantable device of claim 4, wherein the processor is further configured to adaptively adjust the stimulus duty ratio and/or the correlation delay in order to seek out a zero at the at least one sense electrode in a contribution of artefact to the recording of the response.

6. The implantable device of claim 5, wherein the adjusting comprises adjusting the correlation delay so as to desirably align the evoked neural response vector.

7. The implantable device of claim 4, wherein the processor is further configured to adaptively adjust the stimulus duty ratio in order to seek out a zero at the sense electrode in a contribution of artefact to the recording of the response.

8. The implantable device of claim 1, wherein the first charge is between 0.6 times the second charge and 0.9 times the second charge.

9. The implantable device of claim 8, wherein the first charge is 0.75 times the second charge.

10. The implantable device of claim 1, wherein the first stimulus component, second stimulus component and third stimulus component are delivered in a first stimulus phase of the neural stimulus, and wherein the processor is further configured to deliver a second stimulus phase of the neural stimulus after the first stimulus phase of the neural stimulus, by:
delivering a fourth stimulus component of the neural stimulus at the first electrode and a sixth stimulus component of the neural stimulus at the third electrode simultaneously with the fourth stimulus component, the fourth stimulus component and the sixth stimulus component being of the second polarity; and
delivering a fifth stimulus component of the neural stimulus simultaneously with the fourth stimulus component and the sixth stimulus component at the second electrode, the fifth stimulus component being of the first polarity.

11. The implantable device of claim 10, wherein the processor is further configured to:
deliver a third stimulus phase of the neural stimulus after the second stimulus phase of the neural stimulus, by:
delivering a seventh stimulus component of the neural stimulus at the first electrode and a ninth stimulus component of the neural stimulus at the third electrode simultaneously with the seventh stimulus component, the seventh stimulus component and the ninth stimulus component being of the first polarity; and
delivering an eighth stimulus component of the neural stimulus simultaneously with the seventh stimulus component and the ninth stimulus component at the second electrode, the eighth stimulus component being of the second polarity.

12. A method of delivering a neural stimulus, the method comprising:
delivering a first stimulus component of the neural stimulus at a first electrode of an array of electrodes and a third stimulus component of the neural stimulus at a third electrode of the array simultaneously with the first stimulus component, the first stimulus component and the third stimulus component being of a first polarity; and
delivering a second stimulus component of the neural stimulus at a second electrode of the array in between the first electrode and the third electrode simultaneously with the first stimulus component and the third stimulus component, the second stimulus component being of a second polarity opposite the first polarity;
wherein the first, second, and third stimulus components are charge balanced; and
wherein the first stimulus component delivers a first charge which is unequal to a third charge delivered by the third stimulus component, the second stimulus component delivers a second charge, and the first charge and the third charge are selected so as to give rise to reduced artefact.

13. The method of claim 12, further comprising:
obtaining a recording of a response to the neural stimulus at at least one sense electrode of the array; and
detecting a neural response in the recording with a vector detector,
wherein the first charge and the third charge of the neural stimulus have values that cause an artefact vector produced by the vector detector to be non-parallel to an evoked neural response vector produced by the vector detector.

14. The method of claim 13, wherein the inequality between the first charge and the third charge causes the artefact vector to be substantially orthogonal to the evoked neural response vector.

15. The method of claim 13, wherein a correlation delay of the vector detector and a stimulus duty ratio of the first charge to the second charge of the neural stimulus have values which cause the artefact vector to be non-parallel to the evoked neural response vector.

16. The method of claim 15, further comprising adaptively adjusting the stimulus duty ratio and/or the correlation delay in order to seek out a zero at the at least one sense electrode in a contribution of artefact to the recording of the response.

17. The method of claim 16, wherein the adjusting comprises adjusting the correlation delay so as to desirably align the evoked neural response vector.

18. The method of claim 15, further comprising adaptively adjusting the stimulus duty ratio in order to seek out a zero at the sense electrode in a contribution of artefact to the recording of the neural response.

19. The method of claim 12, wherein the first charge is between 0.6 times the second charge and 0.9 times the second charge.

20. The method of claim 19, wherein the first charge is 0.75 times the second charge.

21. The method of claim 12, wherein the first stimulus component, second stimulus component and third stimulus component are delivered in a first stimulus phase of the neural stimulus, the method further comprising:
delivering a second stimulus phase of the neural stimulus after the first stimulus phase of the neural stimulus, by:
delivering a fourth stimulus component of the neural stimulus at the first electrode and a sixth stimulus component of the neural stimulus at the third electrode simultaneously with the fourth stimulus component, the fourth stimulus component and the sixth stimulus component being of the second polarity; and
delivering a fifth stimulus component of the neural stimulus simultaneously with the fourth stimulus component and the sixth stimulus component at the second electrode, the fifth stimulus component being of the first polarity.

22. The method of claim 21, further comprising:
delivering a third stimulus phase of the neural stimulus after the second stimulus phase of the neural stimulus, by:
delivering a seventh stimulus component of the neural stimulus at the first electrode and a ninth stimulus component of the neural stimulus at the third electrode simultaneously with the seventh stimulus component, the seventh stimulus component and the ninth stimulus component being of the first polarity; and
delivering an eighth stimulus component of the neural stimulus simultaneously with the seventh stimulus component and the ninth stimulus component at the second electrode, the eighth stimulus component being of the second polarity.

23. A non-transitory computer readable medium for delivering a neural stimulus, comprising instructions which, when executed by one or more processors, causes performance of the following:
delivering a first stimulus component of the neural stimulus at a first electrode of an array of electrodes and a third stimulus component of the neural stimulus at a third electrode of the array simultaneously with the first stimulus component, the first stimulus component and the third stimulus component being of a first polarity; and
delivering a second stimulus component of the neural stimulus at a second electrode of the array in between the first electrode and the third electrode simultaneously with the first stimulus component and the third stimulus component, the second stimulus component being of a second polarity opposite the first polarity,
wherein the first, second, and third stimulus components are charge balanced; and
wherein the first stimulus component delivers a first charge which is unequal to a third charge delivered by the third stimulus component, the second stimulus component delivers a second charge, and the first charge and the third charge are selected so as to give rise to reduced artefact.

* * * * *